United States Patent [19]
Francois

[11] Patent Number: 4,799,709
[45] Date of Patent: Jan. 24, 1989

[54] SAFETY HARNESS

[76] Inventor: Robert M. Francois, 3105 Cloudcrest Rd., La Crescenta, Calif. 91214

[21] Appl. No.: 122,710

[22] Filed: Nov. 19, 1987

[51] Int. Cl.$^4$ ............................................. B60R 22/00
[52] U.S. Cl. ........................................ 280/801; 2/311; 2/321; 54/44; 54/47; 280/290
[58] Field of Search ...................... 280/801, 290, 1.13, 280/1.22; 2/311, 321, 22, 23; 297/195; 54/37, 44, 46, 47, 49

[56] References Cited

U.S. PATENT DOCUMENTS

| | | | |
|---|---|---|---|
| 558,029 | 4/1896 | Baur | 54/46 |
| 1,397,128 | 11/1921 | Keithley | 54/46 |
| 2,128,159 | 8/1938 | Morgan | 54/44 |
| 3,074,669 | 1/1963 | Bohlin | 280/290 |
| 4,429,419 | 2/1984 | Snyder | 2/305 |

FOREIGN PATENT DOCUMENTS 258497  5/1949  Switzerland ........................ 280/290

Primary Examiner—Kenneth R. Rice
Attorney, Agent, or Firm—Francis X. LoJacono

[57] ABSTRACT

This invention relates to a unique safety harness particularly designed for use with all-terrain type vehicles so as to prevent possible injury to the operator of the vehicle. The safety harness includes a belly strap secured to the vehicle body with a pair of leg restraints removably attached to the belly strap and to each leg of the operator, wherein the leg restraints prevent the legs of the operator from extending downwardly from the vehicle and dangerously contacting the road or ground surface.

3 Claims, 2 Drawing Sheets

SAFETY HARNESS

BACKGROUND OF THE INVENTION

This invention relates generally to a safety harness, and more particularly to a safety leg restraint for use by the operator of an all-terrain vehicle so as to aid in avoiding possible injury while operating the vehicle, be it a three-wheel or four-wheel type.

Recently great concern has been voiced for the safety of operators of all terrain vehicles, commonly referred to as ATVs. These vehicles have become a source of considerable controversy due to the large number of deaths and very high rates of serious injuries to drivers. Between the years of 1982 and 1987, approximately eight hundred deaths and three hundred thousand injuries have been directly related to these types of vehicles. An average of twenty deaths and seven thousand injuries have occurred each month Nationwide in the last two years. It has been well noted that approximately half of such victims are under sixteen years of age. Another report stated that riders of three and four wheel ATVs can lose control and even flip over their vehicles when they strike ruts in roads, rocks or ditches. Due to their high center of gravity, such vehicles also have a tendency to flip over on steep downhill slopes. The slightest change in a downhill direction will often cause a vehicle to flip, thus throwing the rider and causing the vehicle to land or roll over on him or her.

Many injuries also occur when inexperienced drivers instinctively extend their legs so that their feet touch the ground in an attempt to stop or turn. It has been reported that in such cases one of the rear wheels is likely to run up the back of the respective leg of the operator, causing the ATV to flip over and thus throwing him or her off the vehicle.

Therefore, it can be seen that an important object of the present invention is to provide a safety leg restraint that helps prevent just these types of accidents from happening.

Accordingly, another object of the present invention is to provide a means of preventing the driver's feet from touching the ground when operating the ATV vehicle.

Still another object of the invention is to provide a device of this type that includes a belly strap secured about the body of the vehicle, to which a pair of oppositely arranged leg restraints are releasably attached. Each leg restraint includes a vertical leg strap having a stirrup formed at its lower end with a vertically adjustable calf strap, thus preventing the operator from extending either leg and allowing the legs to move in only a forward or rearward direction so as to prevent any engagement of either leg with the wheels of the vehicle.

A further object of the invention is to provide a safety device of this character that is particularly suitable for use by a novice rider of an ATV so as to promote safety until the rider is experienced enough to ride the vehicle without the use of the safety harness.

It is a further object of the invention to provide a device of this character that is easily worn and adjustable to suit any operator of an ATV.

It is still a further object of the present invention to provide a device of this type that is relatively inexpensive to manufacture yet simple and rugged in construction.

The various features of novelty which characterize the invention are pointed out with particularity in the claims annexed to and forming a part of this disclosure. For a better understanding of the invention, its operating advantages by its use, reference should be had to the accompanying drawings and descriptive matter in which there is illustrated and described the preferred embodiment of the invention.

DETAILED DESCRIPTION OF THE DRAWINGS

Referring more particularly to the accompanying drawings which are for illustrated purposes only:

DESCRIPTION OF THE PREFERRED EMBODIMENT

Figure 1:
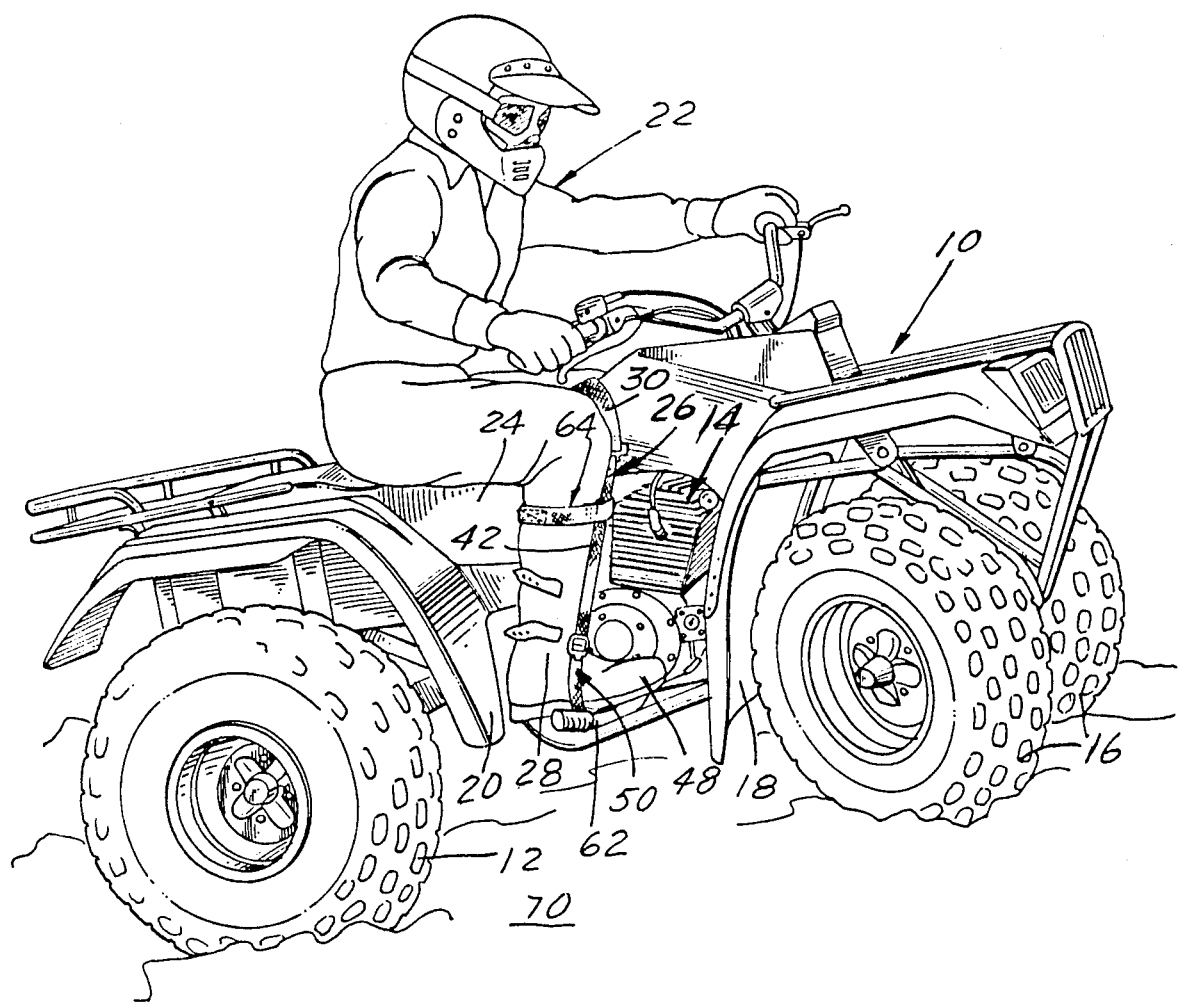
FIG. 1 is a pictorial view of a rider operating a typical all-terrain vehicle with the present invention attached to the vehicle and the rider's legs.

Referring more particularly to FIG. 1, there is shown an all-terrain vehicle (ATV) generally indicated at 10. ATVs are generally provided with either three or four wheels -- that is, two rear wheels 12 which are power driven by motor 14 and one or two front steering wheels 16. Front and rear fenders 18 and 20, respectively, are positioned and arranged to protect the rider when operating vehicle 10. A rider 22 is shown seated over the vehicle belly portion 24 which defines the gas tank.

The present invention, a safety leg restraint, indicated generally at 26, is illustrated as being attached to belly portion 24 and to the rider's leg 28. A more detailed illustration of the safety harness or leg restraint 26 is provided in FIG. 2, wherein said leg restraint 26 comprises a first strap member 30 which defines a belly strap having sufficient length to encircle belly portion 20 of vehicle 10. Belly strap 30 includes an adjustable connecting means, designated generally at 32, which may be any suitable type such as a two-piece disconnect clasp formed by members 34 and 36 attached to the respective free ends of strap 30. A fastening material such as Velcro (trademark) can also be employed as a connecting means.

Affixed to the intermediate portion 31 of belly strap 30 is a strip or strips of suitable fastening material, indicated by numeral 40, arranged to be facing upwardly when belly strap 30 is mounted about the belly portion 24 of vehicle 10. This arrangement allows a pair of second strap members to be removably secured to belly strap 30. These second strap members define a right leg strap 42 and a left leg strap 44, respectively. The upper free end of each leg strap is formed with an enlarged member 45 to which is secured a cooperating fastening material 46 adapted to be removably attached to the corresponding fastening material 40 of the enlarged belly strap 30.

Figure 3:
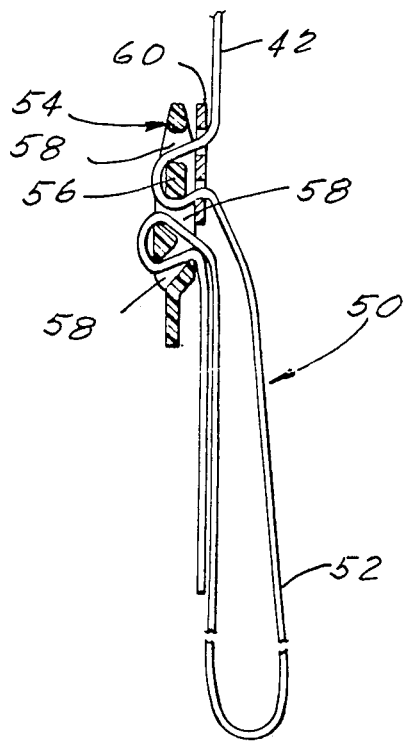
FIG. 3 is an enlarged cross-sectional view of the locking means used to control the size of the foot stirrup taken along line 3—3 of FIG. 2.

When worn by the vehicle rider 22, leg straps 42 and 44 extend upwardly in a vertical direction, as seen in FIG. 1. The upper free end of each leg strap is releasably attached to belly strap 30, and the lower end thereof is attached to foot 48 of the rider 22 by means of a stirrup, generally indicated at 50. The stirrup is formed from an extended portion of each right and left leg strap 42 and 44, respectively. Accordingly, stirrup means 50 is so arranged as to provide an adjustable loop 52 which is established by threading the extended strap portion through a keeper means 54, as illustrated in FIG. 3. The keeper means comprises a buckle member 56 which is provided with a plurality of slots 58 through which the strap 42 is intertwined.

To further provide an adjustable fixed loop to fit the particular rider, there is also employed a locking bar 60 through which strap 42 is additionally threaded. When locking bar 60 is forced against the back of buckle member 56, the loop 52 is prevented from moving against the downward force of the rider's leg 28. Thus, leg strap 42 is held taut longitudinally along the rider's leg, and prevents the rider from extending his or her leg downwardly and off the support bar 62 of vehicle 10.

Figure 2:
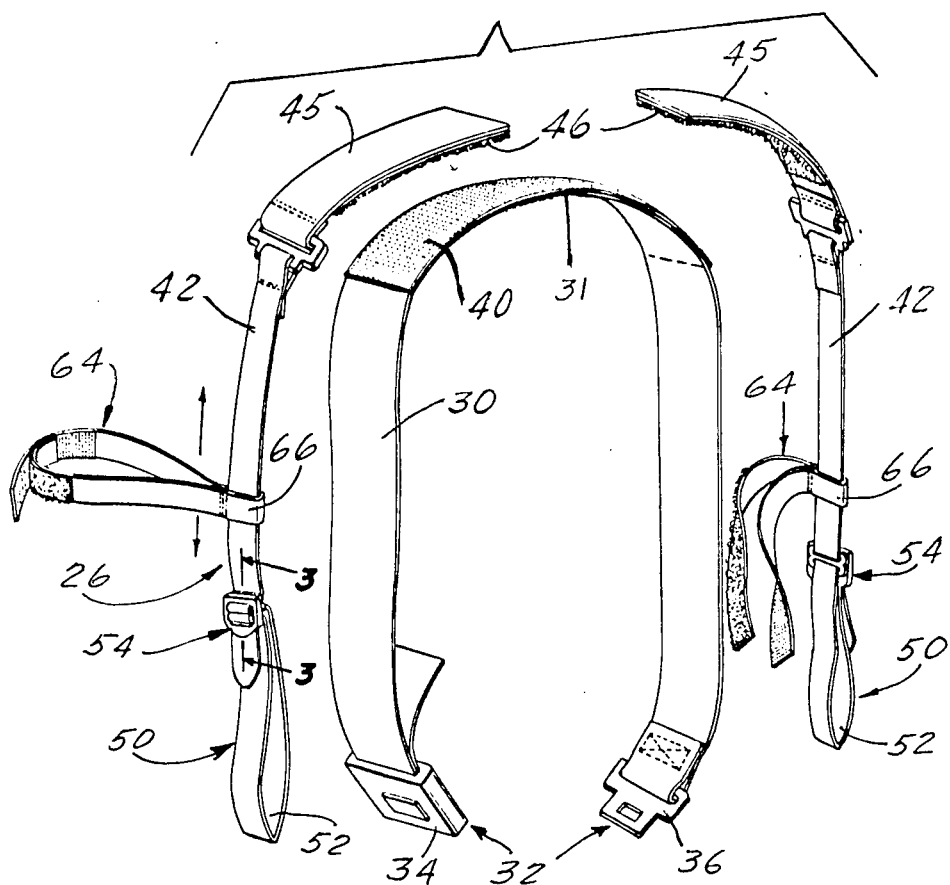
FIG. 2 is an exploded perspective view of the present invention.

Safety harness 26 is further provided with a third strap member slidably mounted to leg straps 42 and 44, as illustrated in both FIGS. 1 and 2. The third strap member defines a calf strap 64 having a centrally positioned, closed and looped tab member 66. Calf strap 64 includes oppositely positioned free ends having securing or fastening means attached thereto, whereby strap 64 can be secured about the respective calf of each leg of the rider, as shown in FIG. 1. Thus, tab member 66 allows calf strap to be adjustable along the leg strap 25 member. The securing means of calf strap 64 are affixed to the free ends thereof, and preferably comprise coupling material, as described herein with respect to leg straps 42 and 44.

Thus, from the above description of the present invention, it can be readily understood that each leg strap is attached to the respective leg of the rider by means of calf strap 64, either before or after strap end members 45 are secured to belly strap 30. Once the leg strap assemblies 42 and 44 are secured in place and the rider's foot is inserted in the corresponding stirrups 50, leg 28 of the rider can only move back and forth by flexing the knee joint but can not move downward to contact the road surface 70, thus preventing great bodily harm or sever injury to the rider.

If, however, the vehicle might tip over, the rider can easily separate himself or herself from the vehicle since the upper connected ends 45 of leg straps 42 and 44 will easily pull apart from the belly strap by an upward movement of the rider, whereby leg straps 42 and 44 would remain secured to the legs.

The foregoing is a description of a preferred embodiment of the invention which is given here by way of example only. The invention is not to be taken as limited to any of the specific features as described, but comprehends all such variations thereof as come within the scope of the appended claims.

I claim:

1. In combination, an all-terrain vehicle and a safety harness releasably attached to said vehicle and the legs of the rider thereof, wherein the combination comprises:

an all-terrain vehicle having a body section whereby said rider sits thereon; and a safety harness including a belly strap which is secured about said body section of said vehicle, and a pair of leg restraints removably attached to said belly strap;

wherein each of said leg restraints comprises:

an elongated leg strap having an upper free end for releasably attaching said leg strap to said belly strap;

removable attaching means disposed between said belly strap and said free end of said leg strap;

stirrup means formed at the opposite end of said leg strap to support the foot of said rider; and a calf strap slidably mounted on said leg strap for attachment to the leg of said rider to secure said leg strap against said leg of said rider, and wherein the length of said leg strap between said belly strap and said stirrup means prevents said leg of said rider from extending downwardly and contacting the ground surface.

2. The combination as recited in claim 1, wherein said stirrup means is defined by an adjustable loop formed at the end of said leg strap.

3. The combination as recited in claim 2, wherein said adjustable loop includes means for adjusting the size of said loop thereof and the length of said leg strap.

* * * * *